US006881462B2

(12) United States Patent
Mullins et al.

(10) Patent No.: US 6,881,462 B2
(45) Date of Patent: Apr. 19, 2005

(54) FROZEN, PREFORMED CURABLE SEAL

(75) Inventors: Dewey L. Mullins, Marietta, GA (US); Stephane Pyrek, Redondo Beach, CA (US); David W. Jordan, Northridge, CA (US)

(73) Assignee: Advanced Chemistry and Technology, Inc., Garden Grove, CA (US)

( * ) Notice: Subject to any disclaimer, the term of this patent is extended or adjusted under 35 U.S.C. 154(b) by 0 days.

(21) Appl. No.: 10/369,407

(22) Filed: Feb. 20, 2003

(65) Prior Publication Data

US 2003/0162026 A1 Aug. 28, 2003

Related U.S. Application Data

(60) Provisional application No. 60/360,555, filed on Feb. 26, 2002.

(51) Int. Cl.$^7$ .................................................. B32B 9/00
(52) U.S. Cl. ..................... 428/41.8; 428/35.2; 428/35.7; 383/59; 383/61.2; 383/61.3; 383/63; 206/813
(58) Field of Search ................................. 206/447, 484, 206/813; 428/35.2, 35.7, 41.8; 383/59, 61.2, 61.3, 64, 63

(56) References Cited

U.S. PATENT DOCUMENTS

| | | | | |
|---|---|---|---|---|
| 2,466,963 A | * | 4/1949 | Patrick et al. ............... 528/387 |
| 3,519,250 A | | 7/1970 | Tibbs et al. .................... 259/72 |
| 3,659,896 A | | 5/1972 | Smith et al. ................... 296/93 |
| 3,708,379 A | | 1/1973 | Flint ............................. 161/36 |
| 3,976,530 A | | 8/1976 | Callan ......................... 156/306 |
| 4,116,742 A | | 9/1978 | Firth .......................... 156/289 |
| T991,001 I4 | | 3/1980 | Donovan et al. ............. 428/40 |
| RE30,843 E | | 1/1982 | Flint ............................. 428/48 |
| 4,366,307 A | * | 12/1982 | Singh et al. ................. 528/373 |
| 4,368,086 A | | 1/1983 | Villemain ..................... 156/93 |
| 4,664,168 A | | 5/1987 | Hong et al. ................. 152/504 |
| 4,816,101 A | | 3/1989 | Hong et al. ............ 156/244.11 |
| 4,866,108 A | * | 9/1989 | Vachon et al. .............. 523/428 |
| 5,929,141 A | * | 7/1999 | Lau et al. .................... 523/458 |
| 6,059,457 A | * | 5/2000 | Sprehe et al. ................ 383/63 |
| 6,176,452 B1 | | 1/2001 | Gallegos ................. 244/135 B |
| 2001/0051260 A1 | | 12/2001 | Johnson et al. .......... 428/317.7 |

OTHER PUBLICATIONS

Abstract, JP 06272407, Jul. 11, 1994.

* cited by examiner

*Primary Examiner*—David J. Buttner
*Assistant Examiner*—Christopher Keehan
(74) *Attorney, Agent, or Firm*—Gifford, Krass, Groh, Sprinkle, Anderson & Citkowski, P.C.

(57) ABSTRACT

A uniformly premixed sealant is provided as a frozen preform that upon warming cures in the preform shape. The storage of the preformed sealant formulation under cold conditions arrests the activity of cure catalysts and accelerators mixed therethrough. A release film is provided to avoid contact with the preformed sealant during application to a substrate. The preformed sealant is particularly well suited for use in aerospace applications.

20 Claims, 1 Drawing Sheet

FROZEN, PREFORMED CURABLE SEAL

RELATED APPLICATION

This application claims priority of U.S. Provisional Patent Application No. 60/360,555 filed Feb. 26, 2002, which is incorporated herein by reference.

FIELD OF THE INVENTION

The present invention relates to multi-component, ambient curing sealant and adhesive compositions suitable for use in sealing and/or bonding components and, more particularly, to methods of sealing aircraft subassemblies using preformed, curable sealant.

BACKGROUND OF THE INVENTION

Thiol-terminated sulfur-containing polymers have a long history of use in aerospace sealants because of their fuel resistant nature upon cross-linking. Among the commercially available polymeric compounds having sufficient sulfur content to exhibit this desirable property are the polysulfide polymers described, e.g., in U.S. Pat. No. 2,466,963 and sold under the trade name Thioplast® polysulfide (Akcros Chemicals, Germany); U.S. Pat. No. 4,366,307 sold in complete sealant formulations by PRC-DeSoto International, Inc. of Glendale, Calif.; and PCT/US01/07736, PCT/US01/07737, and PCT/US01/07738. In addition to fuel resistance, polymers useful in this context must also have the desirable properties of low temperature flexibility, liquidity at room temperature, high temperature resistance, a reasonable cost of manufacture, and not be so malodorous as to prevent commercial acceptance of compositions that contain the subject polymers.

An additional desirable combination of properties for aerospace sealants which is much more difficult to obtain is the combination of long application time (i.e., the time during which the sealant remains usable) and short curing time (the time required to reach a predetermined strength). Singh et al., U.S. Pat. No. 4,366,307, disclose such materials. Singh et al. teach the acid-catalyzed condensation of hydroxyl-functional thioethers. The hydroxyl groups are in the beta-position with respect to a sulfur atom for increased condensation reactivity. The Singh et al. patent also teaches the use of hydroxyl-functional thioethers with pendent methyl groups to afford polymers having good flexibility and liquidity. However, the disclosed condensation reaction has a maximum yield of about 75% of the desired condensation product. Furthermore, the acid-catalyzed reaction of β-hydroxysulfide monomers yields significant quantities (typically not less than about 25%) of an aqueous solution of thermally stable and highly malodorous cyclic byproducts, such as 1-thia-4-oxa-cyclohexane. As a result, the commercial viability of the disclosed polymers is limited.

Another desirable feature in polymers suitable for use in aerospace sealants is high temperature resistance. Inclusion of covalently bonded sulfur atoms in organic polymers has been shown to enhance high temperature performance. However, in the polysulfide polyformal polymers disclosed in U.S. Pat. No. 2,466,963, the multiple —S—S— linkages result in compromised thermal resistance. In the polymers of Singh et al., U.S. Pat. No. 4,366,307, enhanced thermal stability is achieved through replacement of polysulfide linkages with polythioether (—S—) linkages. In practice, however, the disclosed materials also have compromised thermal resistance due to traces of the residual acid condensation catalyst.

Yet another desirable feature of materials useful as aircraft sealants is the ability of the polymeric system to cure or cross-link under ambient conditions. For the purposes of this application, the term "ambient conditions" refers to temperatures and humidity levels typically encountered in an aircraft manufacturing environment. Numerous potentially useful cross-linking reactions occur at ambient conditions.

To achieve the required blend of application and performance properties, current commercial products are usually multi-component sealants. Widely accepted aerospace sealants consist of a first component containing at least one ungelled thiol terminated sulfur containing polymer and a second component containing either an oxidizing compound, e.g., manganese dioxide or any of a variety of Cr(VI) compounds, or a thiol reactive material, e.g. a polyepoxide, polyene or polyisocyanate. Optionally, both the first and second components also contain one or more formulating ingredients chosen from the list of fillers, pigments, plasticizers, stabilizers, catalysts, activators, surface-active compounds, solvents, and adhesion promoters. The types and quantities of these later ingredients are chosen and adjusted such that specific properties are achieved. Any of a number of other reactive groups, e.g., hydroxyl-, amine-, acryloxy-, siloxy- and maleimide, may be introduced onto the sulfur containing polymer backbone. By proper choice of ambient curing chemistry, these alternative reactive groups may be equally substituted for the aforementioned thiol functionality.

Currently, the construction of both small- and large-scale aircraft sub-assemblies is entirely a manual operation. The quality and integrity of the sealed joint or seam is totally reliant on the skill and ability of the sealing operator to: correctly and thoroughly measure and mix the different sealant components; correctly apply the requisite amount of sealant for each bond-line requiring sealing; and reproducibly, over time, repeat this process on every subassembly requiring sealing.

In addition, it is highly desirable for each and every sealing operator to seal each and every sub-assembly in exactly the same manner. In practice, airframe manufacturers have addressed this challenge through comprehensive training programs, detailed sealing procedures and numerous in-process inspections. Despite these efforts, defects are common and resealing requires removing the part from the assembly-line process, an action that substantially diminishes manufacturing efficiency. Thus, there exists a need for a sealant that reduces delivery, labor and variability while affording ambient cure and long term shelf stability.

SUMMARY OF THE INVENTION

A preformed sealant is prepared and capable of curing in a preform shape. The seal is produced by premixing a sealant precursor with a cure component to form a substantially uniform mixture. The mixture is formed to a preform sealant shape and then cooled to arrest cure. Forming by extrusion is a preferred mode. Further, contacting the preform sealant with a release film serves to avoid skin contact therewith during application to a substrate.

A preformed sealant package includes a curable uniformly premixed one-part sealant formulation preformed to a shape adapted to secure to a substrate. A release film is in contact with the formulation. A commercial package includes a preformed sealant package along with instructions for the application of the preformed sealant to a substrate and allowing the sealant formulation to warm to a temperature capable of inducing cure.

DETAILED DESCRIPTION OF THE PREFERRED EMBODIMENTS

The present invention satisfies a long-felt need in the aerospace industry by providing a uniformly premixed sealant as a frozen preform that upon warming cures in the preform shape as compressed against a substrate. This invention accommodates the many types and shapes of bond-lines as well as the differing substrates now in use. Additionally, the present invention satisfies the various performance requirements now delivered by conventional aerospace sealants, while obviating the difficulties in obtaining a sealant with both a long work life and a short cure time. The present invention includes the method of mixing and optionally degassing a multi-component sealant formulation to yield a material that will cure absent further mixing or the addition of other components. The premixed sealant formulation is then preformed and frozen to arrest or at least slow the activity of cure catalysts and accelerators mixed therethrough.

Figure 1:
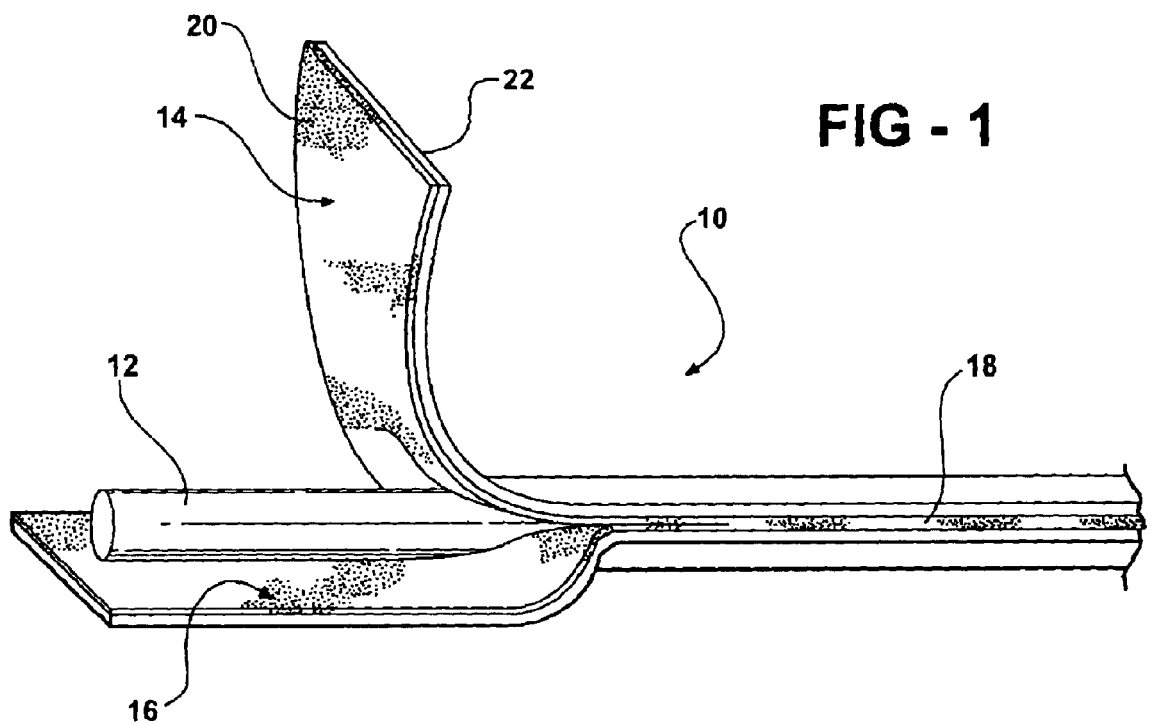
FIG. 1 is a perspective view of a preformed sealant package according to the present invention where the relative dimensions of release film layers are distorted for illustrative purposes.
Figure 2:
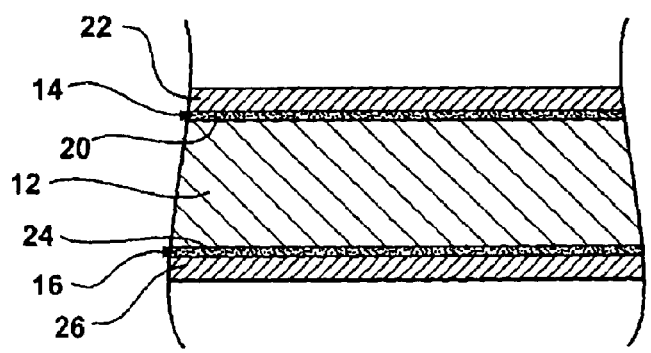
FIG. 2 is a longitudinal cross-section of the inventive package depicted in FIG. 1.
Figure 3:
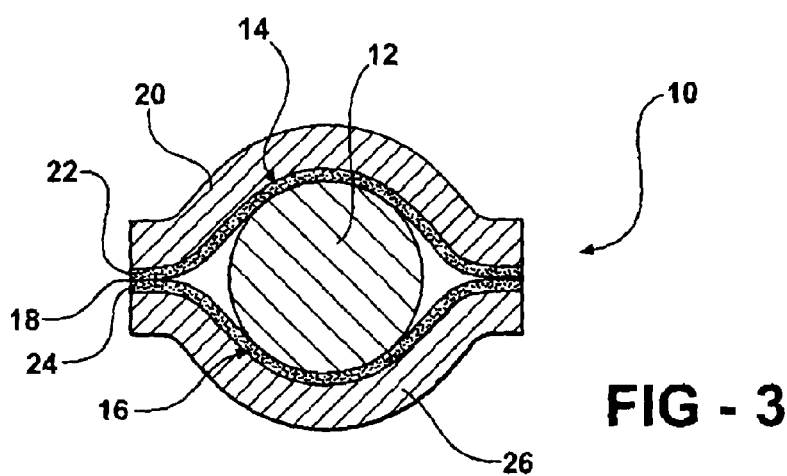
FIG. 3 is a transverse cross-section of the inventive package depicted in FIG. 1.

Referring now to FIGS. 1–3, an inventive commercial package is shown generally at 10. A premixed sealant formulation is preferably formed by extrusion into a preformed sealant 12. It is appreciated that in addition to extrusion, a preformed sealant is produced by molding, casting, die-cutting, and the like. The sealant 12 is applied onto a first release film 14. Typical preformed sealant thickness as measured perpendicular to an adherent substrate thereto ranges from about 1 mm to 10 mm; however, it is appreciated that dimensions beyond this range are also operative herein. Optionally, the release film 14 is composed of a sealant contacting layer 20 laminated to one or more structural layers 22. The first release film 14 is peeled from the preformed sealant 12 and the sealant 12 applied to a substrate. Preferably, an inventive preformed sealant 12 is sandwiched between the first release film 14 and a second like release film 16 to aid in seal alignment and to minimize handling thereof. It is appreciated that the second release film 16 is likewise optionally composed of a sealant contacting layer 24 and one or more structural or external environment barrier layers 26 as detailed above with respect to the first release film 14. Optionally, a bond 18 is provided by conventional means between release films to create a barrier encasing a preformed sealant. The bond 18 being between portions of the first release film when only a single film is present or between opposing edges of the first release film 14 and the second film 16 in a dual release film embodiment depicted in FIGS. 1 and 3. The bond is formed through the application of convention adhesive, thermal bonding, sonic bonding or the like.

The preformed sealant 12 is a substantially uniform mixture of precise stoichiometry that cures upon thaw. Cure typically occurs after warming the preformed sealant to above about −60° C. to 4° C. In addition to the sealant base and curing system components, it is appreciated that the preformed sealant optionally contains plasticizers, fillers and pigments. Preferably, the preformed sealant according to the present invention is packaged and stored with a cold pack having a melting temperature less than the cure temperature of the sealant in order to maintain the preformed sealant in an uncured state upon temporary interruption of cold storage conditions.

The nature of the curable sealant composition utilized herein is largely dictated by the resulting seal performance requirements. In a preferred aerospace embodiment, the sealant is a polythioether or polysulfide polymer. Operative examples illustratively include manganese dioxide and polysulfide, epoxy cured polysulfide, epoxy cured polythioethers, isocyanate cured polysulfide, and isocyanate cured polythioethers. The isocyanate cured hydroxyl terminated polythioether seals represent still another preferred composition of an inventive preformed sealant.

Plasticizers are utilized to provide the cured seal with the desired degree of softness and resiliency. Further, the plasticizer optionally improves the physical properties necessary for extrusion. Plasticizers conventional to the art are operative herein and illustratively include aliphatic oils, waxes, fatty acid salts, and resins derived from alkylated phenols and esters. While the amount of plasticizer present is not critical and indeed depends on variables illustratively including the molecular weight of the seal precursors and the physical requirements of the cured adhesive, in general the plasticizer is present from 0 up to about 40 parts by weight based upon sealant precursor weight. It is further appreciated that a plurality of compatible plasticizers are operative herein.

Various fillers are also optionally incorporated into the preformed sealant. Useful fillers illustratively include clay, talc, carbon black, silica and calcium carbonate. Fillers provide the multi-part uniform mixture with physical properties helpful in adjusting the extrudability of the adhesive preform. Since the adhesive precursors are often low molecular weight liquids up to 10,000 Daltons, the fillers are optionally incorporated into the two-part mixed composition to produce a thicker, easily extruded mass.

Pigments are also optionally included in the preformed sealant mixture. Pigments illustratively include titanium dioxide, zinc sulfide, carbon black and various organic and inorganic substances known to the art.

At the point of use, an inventive commercial package is taken from cold storage and used according to instructions that include the frozen preformed sealant is separated from the release film and is applied to a substrate with a consistency from tack-free to putty-like solid. The working time for the preformed sealant is utilized to shape and otherwise compression conform the extrudate to a desired form against a substrate. An optional second release film is removed after final forming. An additional substrate then optionally is brought into contact with the preformed sealant to create a bond line. The sealant is then thawed to a temperature sufficient to initiate the cure process. The substrate relative position is maintained during cure to a completed seal. It is appreciated that the preformed sealant can be formed in a variety of shapes illustratively including ribbons, discs, sheets, cones, and more complex three-dimensional forms. Preferably, the preformed sealant has a uniform dimension and weight per unit length. While ambient air atmosphere cure is common, it is also appreciated that curing ovens, vacuum ovens and other conventional cure conditions are also operative herewith.

While the present invention has been detailed with respect to an aerospace polysulfide or polythioether based adhesive, it is appreciated that other types of multi-part curable compositions are also operative as premixed, preformed frozen sealants. These other compositions illustratively include butyl rubber, polyamide epoxy resins, polyurethanes, polyalkylenes and copolymers thereof.

All patents and published applications disclosed herein are indicative of the skill in the art. These patents and applications are herein incorporated by reference to the same extent as if each were specifically and individually incorporated by reference.

The foregoing description is illustrative of particular embodiments of the invention, but is not meant to be a limitation upon the practice thereof. The following claims, including all equivalents thereof, are intended to define the scope of the invention.

What is claimed is:

1. A preformed sealant package comprising:
   a curable uniformly premixed sealant formulation comprising a polythioether preformed and frozen to a shape adapted to secure to a substrate; and
   a first release film in contact with said formulation.
2. The package of claim 1 further comprising a bond on said first release film creating a barrier encasing said sealant formulation.
3. The package of claim 1 further comprising a second release film in contact with said formulation.
4. The package of claim 3 wherein said first release film is in simultaneous contact with said formulation and said second release film.
5. The package of claim 4 further comprising a bond at a point of contact between said first release film and said second release film.
6. The package of claim 1 wherein said first release film comprises a sealant contacting layer laminated to at least one structural layer.
7. The package of claim 1 wherein said shape is a sheet.
8. The package of claim 1 wherein the sealant formulation further comprises at least one additive selected from the group consisting of a plasticizer, a filler, and a pigment.
9. The package of claim 1 further comprising a cold pack.
10. The package of claim 1 wherein said shape is selected from the group consisting of: ribbon, disc, and cone.
11. A preformed sealant package comprising:
    a curable uniformly premixed sealant formulation comprising a polysulfide preformed and frozen to a shape adapted to secure to a substrate; and
    a first release film in contact with said formulation.
12. The package of claim 11 further comprising a bond on said first release film creating a barrier encasing said sealant formulation.
13. The package of claim 11 further comprising a second release film in contact with said formulation.
14. The package of claim 13 wherein said first release film is in simultaneous contact with said formulation and said second release film.
15. The package of claim 14 further comprising a bond at a point of contact between said first release film and said second release film.
16. The package of claim 11 wherein said first release film comprises a sealant contacting layer laminated to at least one structural layer.
17. The package of claim 11 wherein said shape is a sheet.
18. The package of claim 11 wherein the sealant formulation further comprises at least one additive selected from the group consisting of a plasticizer, a filler, and a pigment.
19. The package of claim 11 further comprising a cold pack.
20. The package of claim 11 wherein said shape is selected from the group consisting of: ribbon, disc, and cone.

* * * * *